Sept. 27, 1966　　　　R. L. WILSON　　　　3,275,027
REGULATING VALVE DEVICE
Filed June 19, 1964
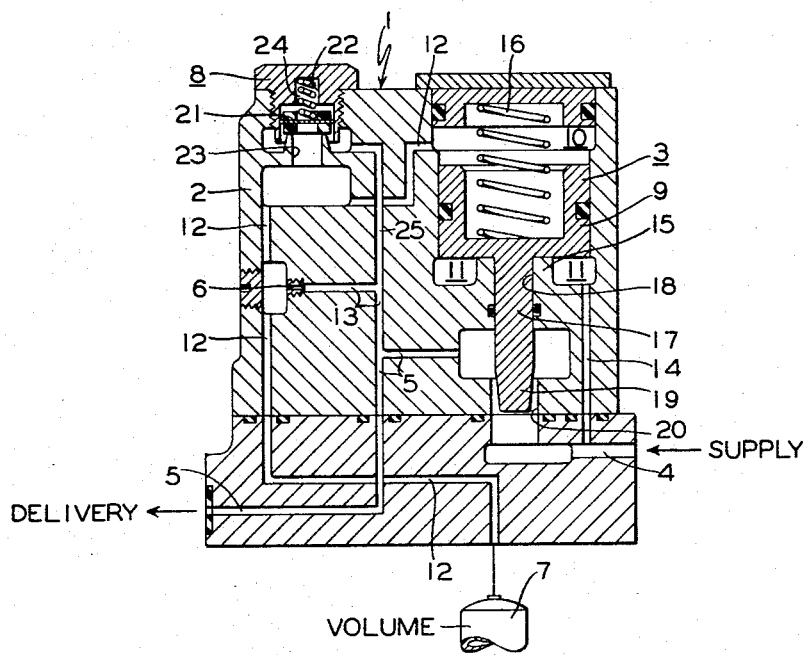
INVENTOR.
Richard L. Wilson
BY Ralph W. McIntire, Jr.
Attorney United States Patent Office 3,275,027
Patented Sept. 27, 1966

3,275,027
REGULATING VALVE DEVICE
Richard L. Wilson, Level Green, Pa., assignor to Westinghouse Air Brake Company, Wilmerding, Pa., a corporation of Pennsylvania
Filed June 19, 1964, Ser. No. 376,327
4 Claims. (Cl. 137—489)

This invention relates generally to regulating valve devices, and relates particularly to a flow regulating device which varies the rate of supply to a delivery port in direct relationship with the average established rate of demand at the delivery port for maintaining pressure in pressure responsive apparatus supplied through the flow regulating means.

In many fluid pressure responsive systems, the valve mechanisms therein are interconnected to perform various functions in response to relative pressure variations in the system occurring as a result of the amount of deviation in the rate of flow in the system relative to an established normal continuous flow rate in the system, such as a minimum flow rate necessary to compensate for leakage in a system. In order to facilitate versatility of such systems for connection with different fluid pressure responsive devices controlled thereby, which devices may establish different normal maintenance flow rates, that is, for example, different maintenance flow rates established by the substitution of different devices of the same type but having different leakage or consumption characteristics, it is desirable to facilitate establishment of a variety of different normal flow rate characteristics in the system for pressure maintenance purposes without requiring modification of or interference with the normal operation of the system. Heretofore, versatility in this regard has been achieved by attempting to employ in the systems various devices, such as chokes, having a compromise capacity or capacities between a maximum and a minimum capacity for providing a range of normal flow rates within which the system will operate. Because of the required sensitivity and inherent limitations in various elements of many fluid pressure responsive systems, the range of applicability of the systems is severely limited, even with the above-described compromise characteristics built into some of the elements.

It is the object of this invention to provide a flow regulating device for connection between a source of supply and fluid systems of the type generally discussed above, to automatically provide a maintenance flow rate to the system in accordance with the demand from the system as established by the various different pressure responsive devices which may be connected to be operated by the systems, which flow regulator is insensitive to rate changes in the system other than the particular established normal maintenance flow rate. For example, in a fluid pressure brake control apparatus for controlling variations in brake pipe pressure in a train brake system, such as that disclosed in copending application Serial No. 369,529, filed May 22, 1964, now Patent No. 3,232,677, by R. L. Wilson and R. W. Donovan, and assigned to the same assignee as the present invention, different leakage characteristics in the brake system ensuing from the coupling of different cars therein would be automatically compensated by the use of a flow regulator, as contemplated in this inventiion, to vary the flow rate of supply through the control apparatus to the brake system in accordance with the leakage rate, to thus maintain the normal brake pipe pressure, and at the same time refrain from interfering with the normal operation of the system in its application and release of brakes.

In the present invention, the above object is achieved by a piston-operated tapered stem reciprocably movable into or out of a passageway for varying the size of an orifice communicating a supply passage with a delivery passage, the insertion of the stem into the passage effecting a decrease in the size of the orifice between the periphery of the stem and the wall of the passageway, and the retraction of the stem effecting an increase in the size of the orifice. The piston is subject on one side thereof to pressure from a source of supply as provided in a first chamber disposed to provide pressure on the piston to effect withdrawal of the stem from the orifice, and is subject on the other side thereof to delivery pressure provided through a choke to a second chamber disposed to provide pressure on the piston to effect insertion of the stem into the passageway. A preloaded check valve is disposed between the first chamber and the delivery passage to blow down the first chamber into the delivery passage in response to a predominant pressure in said first chamber exceeding that in said delivery passage by a predetermined amount beyond the operation maximum pressure differential therebetween. A choke is disposed between the delivery passage on one side thereof and the first chamber and an associated volume on the other side thereof to provide a time delay reaction of the piston member in decreasing the size of the orifice in response to a lesser flow rate in the delivery passage. Thus, the regulator will vary the supply rate of flow to the delivery passage in accordance with the demand or basic maintenance flow rate required at the delivery passage, but at the same time will remain insensitive, because of the time delay feature, to temporary changes in rate of flow in the delivery passage as may be instituted by operation of the apparatus connected to the delivery passage rather than by a basic change in the maintenance flow rate required.

These and other objects will be more readily apparent when taken in conjunction with the following specification and the drawing, in which:

The single figure of the drawing comprises a schematic diagram of a flow regulating valve device embodying the present invention.

Referring now to the drawing, there is shown a flow regulating valve device 1 comprising a casing 2 having disposed therein a variable orifice control valve device generally indicated at 3 for controlling communication between a supply passage 4 and a delivery passage 5, a choke 6 for delaying operation of the control valve 3 in response to rate of flow changes in the delivery passage 5, a volume 7 to provide sensitivity for the operation of the control valve 3, and a check valve generally indicated at 8 for effecting immediate flow rate increasing operation of control valve 3 in response to a reduction in pressure in delivery passage 5 relative to the supply passage 4 resulting in a greater pressure differential therebetween than that contemplated in the normal operation of the flow regulator, such as to provide the highest rate of flow to the delivery port during an initial charging operation of the apparatus connected to the delivery passage 5.

The control valve device 3 comprises a piston member 9 disposed in a cavity to divide the same into a pair of chambers 10 and 11. Chamber 10 is communicated with the delivery passage 5 by means of a passage 12, through previously mentioned choke 6, and branch passage 13 of delivery passage 5. Chamber 11 is communicated with supply passage 4 by means of branch passage 14 of supply passage 4. The piston 9 is biased downwardly against a shoulder 15 in the wall of chamber 11 by means of a spring member 16 compressed between piston 9 and the wall of chamber 10. A valve stem 17 is carried by the piston 9 for reciprocable movement in a suitable stem bore 18. The distal end 19 of valve stem 17 is tapered and is coaxially received in a passage 20 having a constant diameter slightly larger than the maximum diameter of valve stem 17. The lower end of passage 20 communicates with supply passage 4, and the upper end of passage 20 communicates with delivery passage 5 so that when the piston 9 is disposed against shoulder 15 by the force of spring 16, the tapered end 19 of stem 17 is fully inserted into passage 20 providing a minimum clearance or orifice between the valve stem 17 and passage 20, to thus minimize the rate of flow of fluid from supply passage 4 through passage 20 to delivery passage 5. When the fluid pressure in chamber 11 exceeds the combined fluid pressure and bias pressure of spring 16 in chamber 10, spring 16 is compressed effecting withdrawal of stem end 19 from passage 20 to gradually increase the size of the orifice between the walls of passage 20 and the stem end 19 to thus increase the rate of fluid flow from supply passage 4 through passage 20 to delivery passage 5.

The check valve 8 is disposed between delivery passage 5 and chamber 10 of the control valve device 3, and comprises a valve member 21 disposed in a chamber 22 and biased into seating engagement upon the opening to branch passage 23 of passage 12 by means of a spring 24. Chamber 22 is communicated with delivery passage 5 by way of branch passage 25 of branch passage 13 of delivery passage 5. From the foregoing, it is seen that valve member 21 is subject to a valve opening force in passage 23 as provided by the pressure in volume 7 through passage 12 to branch passage 13, and also as provided by pressure in chamber 10 as transmitted through passage 12 to branch passage 13. Valve member 21 is subject to a valve closing force in chamber 22 as provided by spring 24 and the delivery pressure as provided from delivery passage 5, through branch passage 13, and branch passage 25. Accordingly, by selecting spring 24 for a relatively high strength, check valve member 21 will open to vent chamber 10 to effect operation of control valve 3 to immediately increase the rate of fluid flow from supply passage 4 to delivery passage 5 only in response to an extreme differential in pressure, as will be present only when the delivery pressure in passage 5 is abnormally low, such as during initial charging of the fluid pressure responsive devices attached to delivery passage 5.

In the operation of the device, it will be assumed that the supply passage 4 is communicated with a standard source of supply, such as a compressor (not shown), supplying fluid through a standard feed valve device (not shown). It will also be assumed that the delivery passage 5 is communicated with any one of a number of different fluid pressure responsive systems which may have different basic fluid flow rates necessary to maintain the pressure in the system. The control valve device 3 and check valve device 8 are in the positions shown prior to connection of the source to the supply passage 4.

When feed valve pressure is initially applied to supply passage 4, supply pressure is transmitted through branch passage 14 to chamber 11 in control valve device 3 providing an upward force on piston 9 overcoming the biasing force of spring 16. Inasmuch as the pressure at this time in delivery passage 5, volume 7, and chamber 10 of control valve 3 is at zero, piston 9 moves fully upwardly to open the orifice between stem end 19 and passage 20 providing the highest rate of fluid flow from supply passage 4 through passage 20 to delivery passage 5 and to the apparatus to be charged thereby. As the apparatus achieves its fully charged condition, the pressure in delivery passage 5 gradually increases, thus effecting a corresponding build-up in pressure in volume 7 and chamber 10 of control valve device 3 through branch pipe 13 of passage 5 and choke 6 to passage 12, which pressure increase in chamber 10 cooperates with the biasing force of spring 16 to move piston 9 downward toward chamber 11 to gradually decrease the size of the orifice between the end 19 of stem 17 and the walls of passage 20 to correspondingly decrease the rate of flow from supply passage 4 to delivery passage 5. Assuming that the pressure responsive apparatus requires a minimum rate of fluid flow therethrough greater than zero to maintain the pressure in the system, for example, as may be caused by leakage in the apparatus, the pressure in delivery passage 5 will tend to remain slightly lower than that in passage 4 because of the constant small rate of flow through delivery passage 5, and, consequently, the corresponding pressure in volume 7 and chamber 10, in cooperation with the biasing force of spring 16, will be insufficient to move the piston into engagement with shoulder 15 in chamber 11, thus the pressure in chamber 11 will hold the tapered end 19 of stem 17 slightly withdrawn from passage 20 to maintain an optimum orifice size between the tapered end 19 and passage 20 to establish a basic flow rate required to maintain the pressure in the pressure responsive apparatus connected to delivery passage 5. If the normal maintenance flow rate from delivery passage 5 to the apparatus should change, because of the addition, substitution or subtraction of equipment, or because of a different leakage rate, the flow regulator 1 will adjust to a different flow rate accordingly, to maintain the pressure within the pressure responsive apparatus. For example, if the maintenance flow rate requirements should increase, as caused by an increased leakage rate, a corresponding pressure reduction would occur in delivery passage 5, which reduction would be sensed by a corresponding reduction in pressure through choke 6 and passage 12 to volume 7 and chamber 10 of control valve 3, effecting upward movement of piston 9 until the force of spring 16 combined with the reduced pressure in chamber 10 equals that in chamber 11, to thus appropriately enlarge the orifice between the tapered end 19 and the passage 20, which, in turn, effects an appropriate increase in rate of flow from supply passage 4 to delivery passage 5 to maintain the pressure responsive apparatus in accordance with the new leakage rate.

The choke 6, disposed between the delivery pipe 5 on one side thereof and the chamber 10 and the volume 7 on the other side thereof, provides a time delay sensing of change in flow rate at the delivery passage 5 to assure any change in flow rate made by operation of the control valve device 3 is consummated only in response to a change in the basic maintenance flow rate rather than in response to temporary changes in rate of flow as effected by operation of various elements of the pressure responsive apparatus. Thus, pressure responsive apparatus designed for operation in response to relative pressure changes therein or in apparatus associated therewith may be rendered fully operative without having to take into account changes in maintenance flow rates therethrough, the regulator 1 being operative automatically to maintain the pressure in the apparatus system, and being insensitive to temporary rate of flow changes caused by operation of the pressure responsive apparatus itself.

Having now described the invention, what I claim as new and desire to secure by Letters Patent, is:

1. A fluid flow regulating device comprising:
   (a) a casing having
      (i) a supply passage adapted for connection to a source of fluid supply under pressure,
      (ii) a delivery passage adapted for connection to a fluid pressure responsive apparatus, and
      (iii) a third passage communicating said fluid supply passage with said delivery passage,
   (b) means for varying the size of said third passage increasingly and decreasingly in a range having a predetermined minimum, said predetermined minimum providing constantly open communication between said supply passage and said delivery passage,
   (c) piston means responsive to the predominant sum of fluid force and spring-biasing force in a first chamber relative to the pressure in a second chamber to operate said size varying means to decrease the size of said passage, and responsive to a predominant fluid pressure in said second chamber over the fluid force and spring-biasing force in said first chamber to operate said size varying means to enlarge said third passage, said first chamber being communicated with said delivery passage, and said second chamber being communicated with said supply passage, and (d) time delay means disposed between said delivery passage and said first chamber for delaying transmission of pressure changes in said delivery pipe to said first chamber.

2. The fluid flow regulating device recited in claim 1, further characterized in that said time delay means includes a choke.

3. The fluid flow regulating device as recited in claim 1, further characterized in that said time delay means comprises a volume communicating with said first chamber, and a choke communicating said volume and said first chamber to said delivery passage.

4. A fluid flow regulating device, comprising:
 (a) a casing having
  (i) a supply passage adapted for connection to a source of fluid supply under pressure,
  (ii) a delivery passage adapted for connection to a fluid pressure responsive apparatus,
  (iii) a third passage communicating said fluid supply passage with said delivery passage,
 (b) means for varying the size of said third passage,
 (c) piston means responsive to the predominant sum of fluid force and spring-biasing force in a first fluid chamber relative to the fluid force in a second chamber to operate said size varying means to decrease the size of said passage, and responsive to a predominant fluid force in said second chamber over said fluid force and said spring-biasing force in said first chamber to operate said size varying means to enlarge said passage, said second chamber being communicated with said supply passage,
 (d) a check valve means disposed between said first chamber and said delivery passage to dump said first chamber to said delivery passage only in response to a pressure differential between said first chamber and said delivery passage larger than the maximum pressure differential in a predetermined normal pressure differential range, and
 (e) choke means disposed between said first chamber and said delivery passage in bypass of said check valve means to provide fluid pressure flow to said first chamber from said delivery passage and to provide time delay transmission of fluid from said first chamber to said delivery passage to oppose operation of said piston means in response to temporary differentials in pressure within said predetermined normal pressure differential range between said first chamber and said delivery passage.

References Cited by the Examiner
UNITED STATES PATENTS

| | | | |
|---|---|---|---|
| 1,838,343 | 12/1931 | Widell | 137—503 |
| 2,102,865 | 12/1937 | Vickers | 137—501 XR |
| 2,492,859 | 12/1949 | Griswold | 137—496 X |
| 3,165,115 | 1/1965 | Erson | 137—494 |

M. CARY NELSON, *Primary Examiner.*

MARTIN P. SCHWADRON, *Examiner.*

A. ROSENTHAL, *Assistant Examiner.*